_United States Patent Office_

3,591,676
Patented July 6, 1971

3,591,676
SURGICAL ADHESIVE COMPOSITIONS
Gary F. Hawkins, Kingsport, Tenn., and David W. Fassett, Rochester, N.Y., assignors to Eastman Kodak Company, Rochester, N.Y.
No Drawing. Filed Nov. 1, 1968, Ser. No. 772,847
Int. Cl. A61l *15/00, 17/00*
U.S. Cl. 424—81                                    2 Claims

ABSTRACT OF THE DISCLOSURE

Surgical adhesive compositions for bonding body tissues and characterized by a high degree of spreadability and good foreign body reaction comprising comprising mixtures of methyl 2-cyanoacrylate with dimethyl methylenemalonate and with higher esters of 2-cyanoacrylic acid.

---

This invention relates to surgical adhesive compositions for the bonding of body tissues and composed of a mixture of methyl 2-cyanoacrylate and another ester. More particularly, the invention relates to methyl 2-cyanoacrylate—containing adhesive compositions containing another ester and characterized by excellent spreadability, good foreign body reaction and ready biodegradability.

The usual methods for closing incisions in flesh and for setting bone fractures, by the use of sutures, clamps, pins, or the like, have many drawbacks. The use of an adhesive substance for these surgical purposes would have the advantage of permitting rapid joining of the damaged members and of permitting natural healing. However, the common adhesives are unsuitable for surgical use. Most adhesives need too much time to form a bond. Many require the use of heat or pressure or the evaporation of a solvent, all of which make them unsuitable as surgical adhesives. Other adhesives, including some that might otherwise be suitable for surgical use, are excessively irritating to the body tissue.

The efficacy of the esters of 2-cyanoacrylic acid as adhesives for general industrial and other uses is well known, having been described and claimed in numerous U.S. and foreign patents and in the literature. More recently, the medical and patent literature has disclosed that certain of these 2-cyanoacrylates can be successfully used in many surgical applications as, for example, in the setting of fractured bone structures, as substitutes for, or adjuncts to, surgical sutures, in retarding the flow of blood from wounds and as aids in the repair and regrowth of living tissue generally.

This invention has as an object to provide a new and improved type of surgical adhesive composition for the bonding of body tissues under conditions in which excellent spreadability of the bonding composition is obtained and under which there is a minimal amount of tissue reaction and ready removal of the composition from the site of deposition.

A further object is to provide a surgical composition in which the excellent adhesive properties of methyl 2-cyanoacrylate are retained but enhanced by the presence of a second ester which may contribute increased spreadability or other desirable properties.

Other objects will appear hereinafter.

These objects are accomplished by the following invention which in its broader aspects, comprises compounding a surgical adhesive by mixing an ester such as dimethyl methylenemalonate or a higher ester of 2-cyanoacrylic acid such as n-butyl 2-cyanoacrylate with methyl 2-cyanoacrylate in varying proportions and applying this mixture to body tissues to be adhesively joined or bonded.

The added ester may be dimethyl methylenemalonate, as such, or a higher ester of 2-cyanoacrylic acid in which the ester moiety contains 2 to 10 carbon atoms. Examples of such higher esters are those in which the ester moiety is one selected from ethyl, n-propyl, isopropyl, n-butyl, isobutyl, sec.butyl, n-pentyl, isopentyl, n-hexyl, isohexyl, 2-ethylhexyl, n-heptyl, isoheptyl, n-octyl, isooctyl, nonyl, decyl, 3-methoxybutyl, 2-ethoxyethyl, etc.

We have found that particular combinations of monomeric methyl 2-cyanoacrylate with other monomeric esters will result in the retention of the useful properties of each of the monomers and would lessen or reduce the undesirable properties of each of the monomers. For example, methyl 2-cyanoacrylate has useful properties as a surgical adhesive, in that it is readily biodegradable, and therefore, is readily removed from the site. However, when used alone, it causes more tissue reaction than other esters of 2-cyanoacrylic acid. On the other hand, some types of surgical adhesives, which have less tendency to induce local reactions, are not as readily biodegradable, that is, are not as readily removed from the site of deposition. In the following examples, which are included for a better understanding of the invention, typical examples of combinations of methyl 2-cyanoacrylate with other esters, such as the dimethyl methylenemalonate and the higher esters of the 2-cyanoacrylic acid, and the use of such mixtures in the bonding of body tissues, are given along with the particular advantageous results obtained from the use of the particular mixtures.

In the examples employing guinea pigs as set forth below, the general procedure was that the guinea pigs were anesthetized with ether and full thickness incisions were made in the depilated skin of the back. Bleeding was controlled if necessary by sponging. After bleeding had stopped or was minimal the adhesive composition was drawn into a capillary tube and small quantities were applied to one or both surfaces of the skin from the capillary tube. The two edges of the wound were lightly pinched together until they adhered. Normally in these tests, the intact skin was swabbed with 70 percent ethanol. The instruments were clean, though not necessarily sterile. The monomeric esters are generally sterile as produced and do not permit growth of most organisms with which they may be contacted accidentally. No frank infections were noted in the experimental animals.

EXAMPLE 1

A mixture of 75 percent dimethyl methylenemalonate and 25 percent methyl 2-cyanoacrylate was prepared. A test of the adhesive and other properties of the mixture was made using a skin incision in the guinea pig. As described in the preceding paragraph, the adhesive mixture was used to close a skin incision in the posterior midline of the back of the guinea pig and compared with the results obtained by application of dimethyl methylenemalonate alone in a similar incision in the anterior portion of the dorsum of the guinea pig. The results indicated that both the dimethyl methylenemalonate alone and the mixture of this compound with methyl 2-cyanoacrylate had good surgical properties and it was possible to obtain immediate closure of the wound. Inspection at 24 hours showed both incisions were dry with no evidence of failure of closure or bleeding, etc. Fourteen days later inspection showed that the anterior incision (dimethyl methylenemalonate) appeared clean but there was some failure of complete epithelial regeneration on the surface. On the other hand, the posterior incision made with the mixture was well healed with only a slight scar being visible.

Histological examinations of the area of the two skin incisions showed firmly healed scars with generally intact epithelium. There was a fairly wide area of fibrosis in the dermis. However, there did appear to be a difference in that more foreign body reaction was apparent in the anterior site using the dimethyl methylenemalonate alone than in the posterior site. More giant cells were present in the anterior incision.

The results of this test indicate a positive improvement in results obtained with the combination compared to the use of the methylenemalonate monomer.

EXAMPLE 2

In this experiment a combination of the monomers of methyl 2-cyanoacrylate and n-butyl 2-cyanoacrylate was used. In one case the proportions were 50 percent of the n-butyl ester and 50 percent of the methyl ester. In the second case the proportions were 75 percent of the n-butyl ester and 25 percent of the methyl ester. The two incisions were made on the back of a guinea pig as indicated previously. In this case, an anterior and a posterior incision were made but both were closed with the same compound. Both incisions were immediately sealed with the mixture although the lower was somewhat more successful than the upper. Seven days later both incisions were healed firmly with little obvious inflammation. Histologic examination showed intact epithelium at both incisions with only a moderate amount of fibrosis. Polymer retention was present but not marked. At the base of the incision, particularly, there was only a very fine fibrous scar to be noted.

EXAMPLE 3

An experiment similar to that of Example 2 was performed using a mixture composed of 25 percent by weight methyl 2-cyanoacrylate and 75 percent by weight n-butyl 2-cyanoacrylate. Both incisions were sealed promptly and at the time of autopsy on the seventh day, there was good healing with very little obvious evidence of inflammation. Histologic studies showed both the upper and lower incisions were more or less identical. The epithelium was intact, a very firm well healed scar was present, but there was a somewhat wider area of fibrosis and more polymer noted than in the case of the use of 50—50 ester mixture. This was apparently related to the higher content of n-butyl which is not as readily removed from the site. These studies demonstrate that mixtures of monomers can be used successfully as surgical adhesives and furthermore that it is possible to improve their properties in a beneficial way; e.g., a lesser amount of unwanted polymer formation and retention by placing a portion of the n-butyl ester with the methylester.

As indicated by the results stated in the above examples it will be evident that in the present invention we have provided surgical adhesive compositions of especial efficacy in bonding living tissue by virtue of their properties of spreadability, good foreign body reaction and ready biodegradability. Spreadability is an especially valuable property in compositions of this type and may be defined as, or measured by, the diameter of a spot of the adhesive formed by placing one drop of the monomer onto the surface of human blood. The spreadability of typical compostions of this invention composed of methyl 2-cyanoacrylate and another ester such as dimethyl methylenemalonate or a higher ester of 2-cyanoacrylic acid is indicated in the following tabulation which also shows an improvement in the setting time due to the presence of the second ester component.

| Monomer | Spot size, cm. | Time of set |
| --- | --- | --- |
| (A) Methyl 2-cyanoacrylate | 0.63–0.95 | 5 minutes. |
| (B) Dimethyl methylenemalonate | 2.5 | 10 seconds. |
| (C) 25% (A) and 75% (B) | 4.4 | 2 to 3 seconds. |

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A surgical adhesive composition for the bonding of body tissues and characterized by a high degree of spreadability, good foreign body reaction and ready biodegradability comprising a mixture of methyl 2-cyanoacrylate and dimethyl methylenemalonate.

2. The composition of claim 1 which is comprised of a mixture of 25 percent by weight of methyl 2-cyanoacrylate and 75 percent by weight of dimethyl methylenemalonate.

References Cited

UNITED STATES PATENTS

| | | | |
| --- | --- | --- | --- |
| 2,721,858 | 10/1955 | Joyner et al. | 260—67 |
| 2,784,127 | 3/1957 | Joyner et al. | 154—43 |
| 3,221,745 | 12/1965 | Coover et al. | 128—334 |
| 3,223,083 | 12/1965 | Cobey | 128—92 |
| 3,483,870 | 12/1969 | Coover et al. | 128—344 |
| 3,178,379 | 4/1965 | Wicker et al. | 260—17 |

OTHER REFERENCES

Matsumoto, T. et al. Arch. Surg. 95:685–688 October 1967 "Disposable Aerosol Tissue Adhesive Spray."

SHEP K. ROSE, Primary Examiner

U.S. Cl. X.R.

128—344